United States Patent [19]
Godbersen

[11] Patent Number: 5,161,622
[45] Date of Patent: Nov. 10, 1992

[54] FIELD CULTIVATOR LEVELING DEVICE

[76] Inventor: Byron L. Godbersen, Lake LaJune Estates, Ida Grove, Iowa 51445

[21] Appl. No.: 756,450

[22] Filed: Sep. 9, 1991

[51] Int. Cl.$^5$ .......................... A01B 5/04; A01B 49/02
[52] U.S. Cl. .................................... 172/140; 172/178; 172/776; 172/180; 172/452; 172/311
[58] Field of Search ............... 172/140, 138, 142, 145, 172/148, 149, 169, 175, 178, 180, 195, 198, 662, 776, 452, 458, 480, 4, 676, 134, 311

[56] References Cited

U.S. PATENT DOCUMENTS

| | | | |
|---|---|---|---|
| 3,085,634 | 4/1963 | Hotchkiss, Jr. | |
| 3,090,447 | 5/1963 | Hotchkiss, Jr. | 172/178 |
| 3,090,449 | 5/1963 | Hotchkiss | 172/178 |
| 3,177,828 | 4/1965 | Cramer | 172/178 |
| 4,034,687 | 7/1977 | van der Lely | 172/776 |
| 4,049,061 | 9/1977 | van der Lely et al. | 172/619 |
| 4,050,523 | 9/1977 | Poland | 172/458 |
| 4,245,706 | 1/1981 | Dietrich, Sr. | 172/180 |
| 4,542,793 | 9/1985 | Dietrich, Sr. | |
| 4,561,504 | 12/1985 | Anderson | 172/142 |
| 4,790,389 | 12/1988 | Adee et al. | 172/776 |
| 4,813,489 | 3/1989 | Just et al. | |
| 4,865,132 | 9/1989 | Moore, Jr. | 172/140 |
| 4,907,652 | 3/1990 | Henry et al. | 172/180 |
| 5,052,495 | 10/1991 | McFarlene | 172/140 |

FOREIGN PATENT DOCUMENTS 2135563  9/1984  United Kingdom ................ 172/180

OTHER PUBLICATIONS

Farm Show Flier, vol. 8, No. 2, Apr. 1984.
Hiniker "Track Eliminator" Brochure, Oct. 1983.

Primary Examiner—Randolph A. Reese
Assistant Examiner—Spencer Warnick
Attorney, Agent, or Firm—Henderson & Sturm

[57] ABSTRACT

In combination with a wheeled first cultivator which is pulled by a prime mover and which has a frame assembly to which ground engaging members are attached, an improved implement comprising a frame, a mounting unit for attaching the frame to the rear of the first cultivator, one or more second cultivators attached to the frame, a drawbar unit pivotally connected at its front end to the implement frame and having a ground engaging caster wheel unit at its rear end, and a hydraulically operated device interconnected between the frame and the drawbar unit to transfer weight forwardly to the first cultivator rear end, such that as weight is applied downwardly on the implement frame, a positive upward pressure is applied to the rear end of the first cultivator; with attendant advantages in adjusting the down pressure and carrying height of the implement frame.

14 Claims, 7 Drawing Sheets

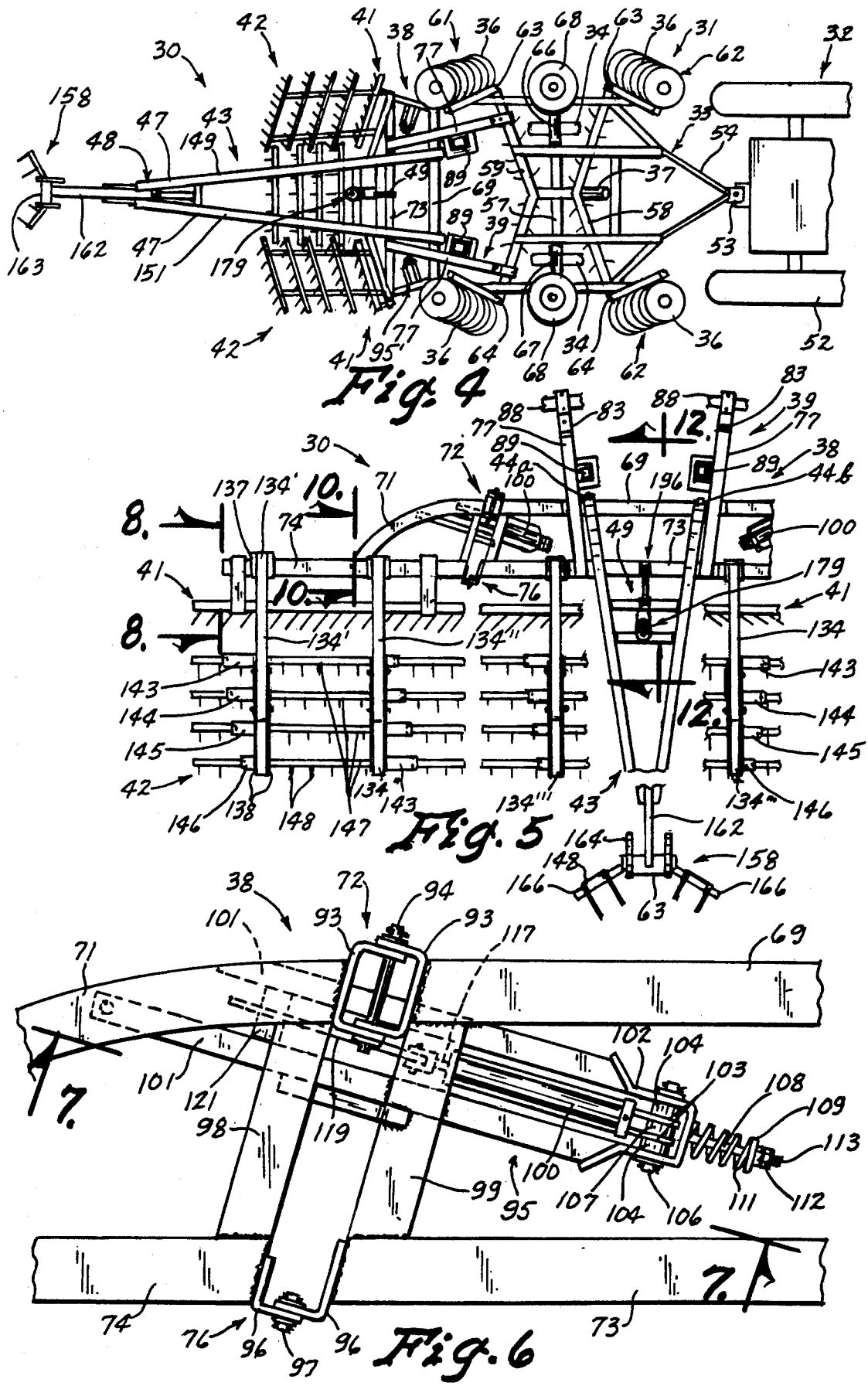

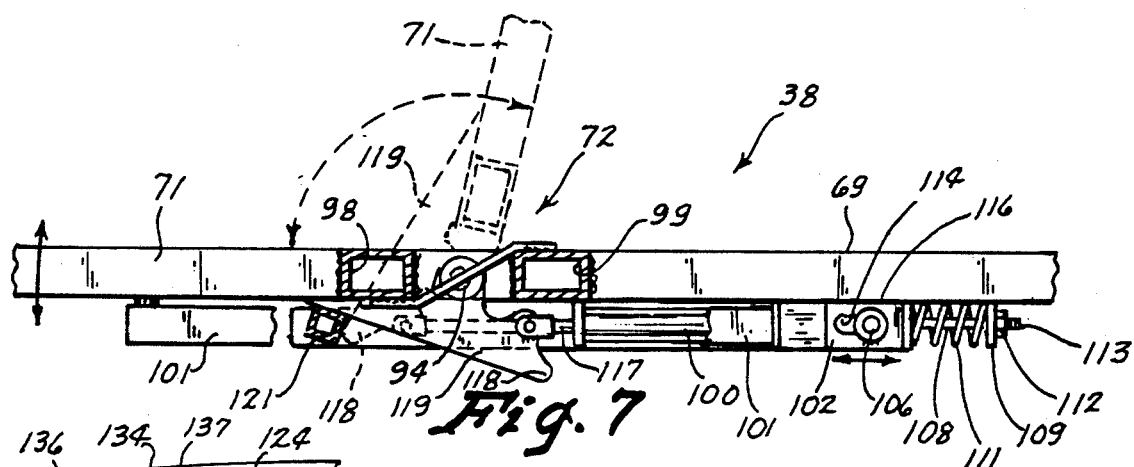
Fig. 7
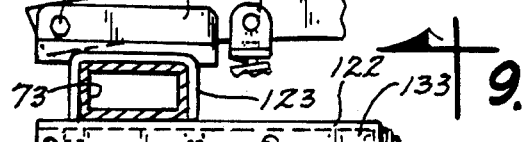
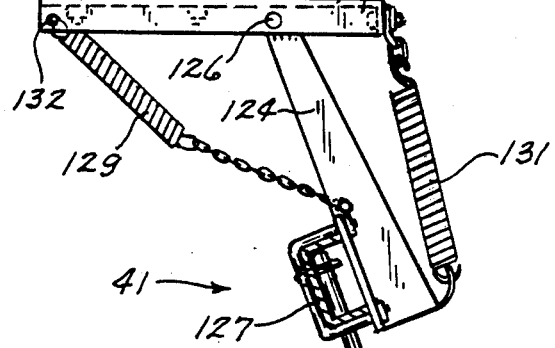
Fig. 8
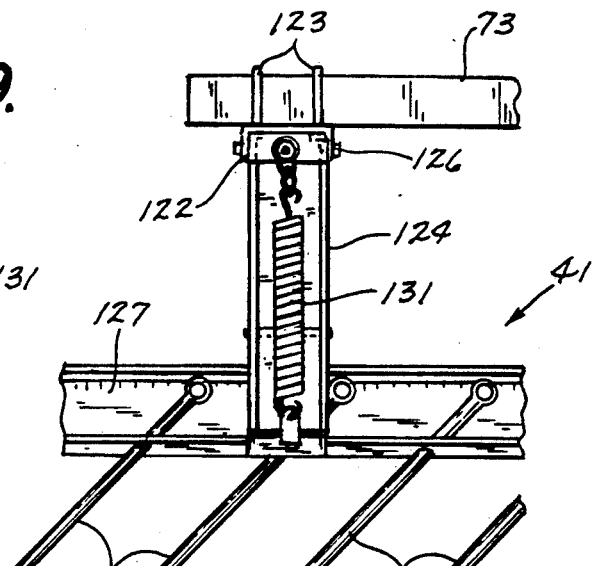
Fig. 9
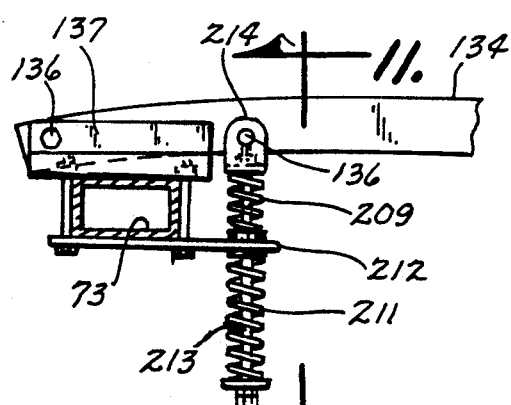
Fig. 10
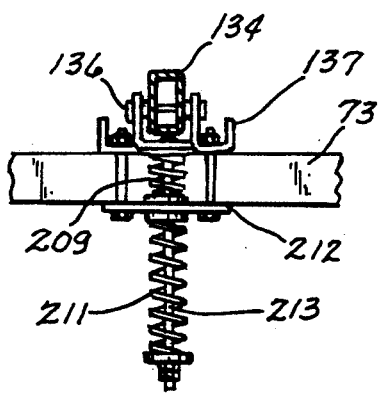
Fig. 11

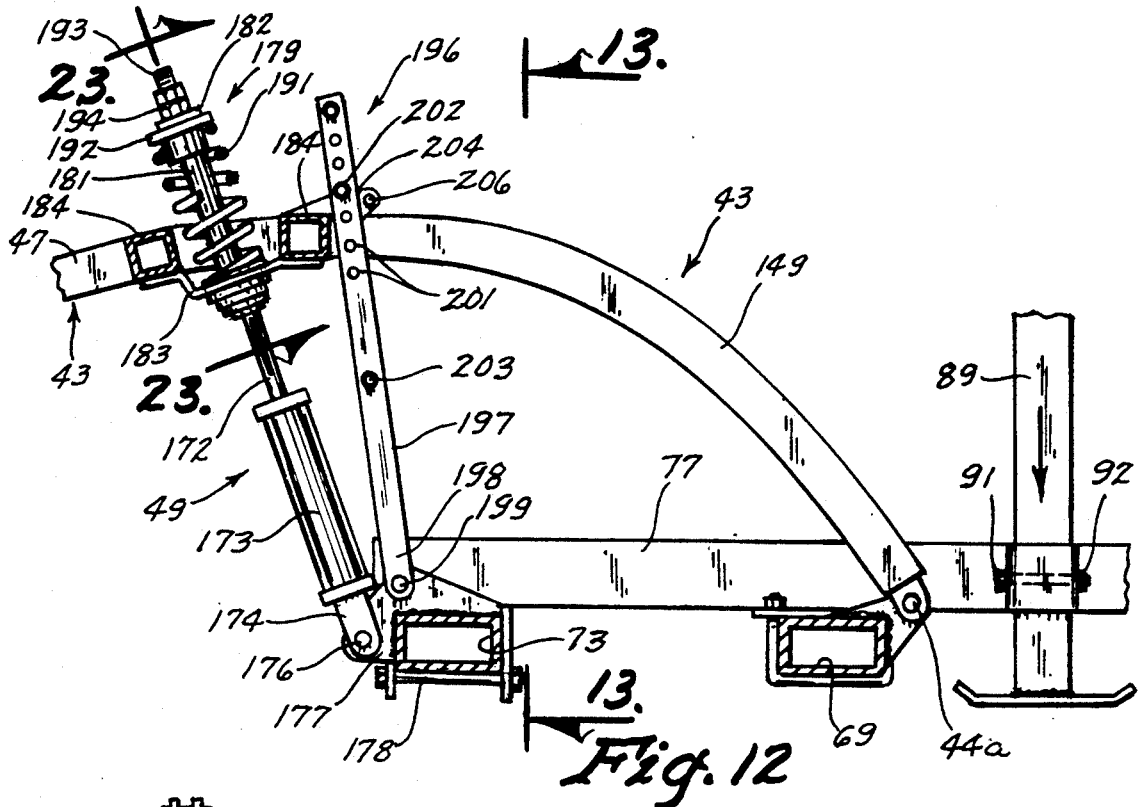
Fig. 12
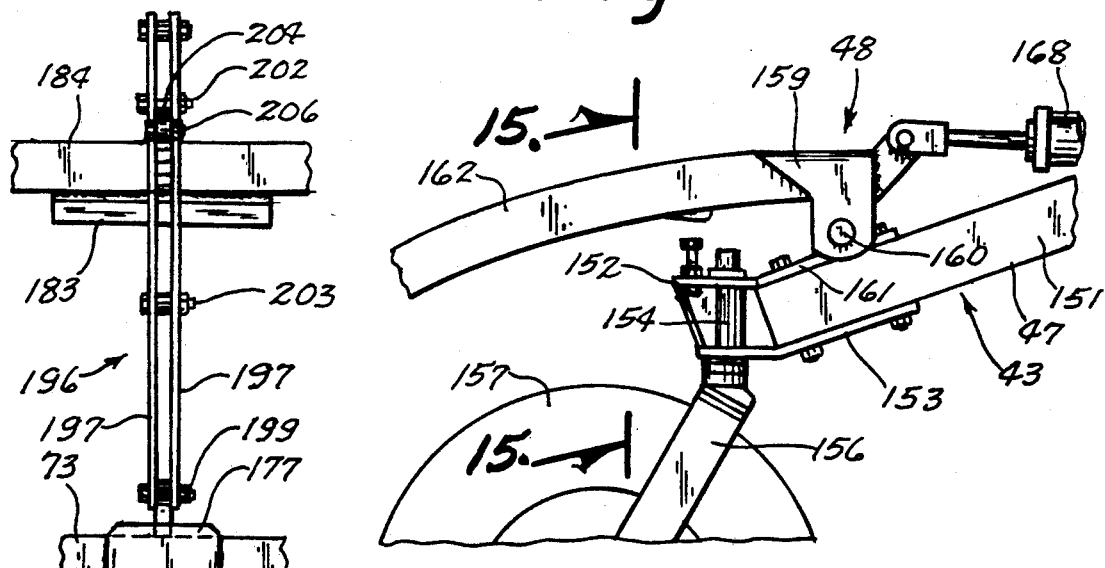
Fig. 13
Fig. 14

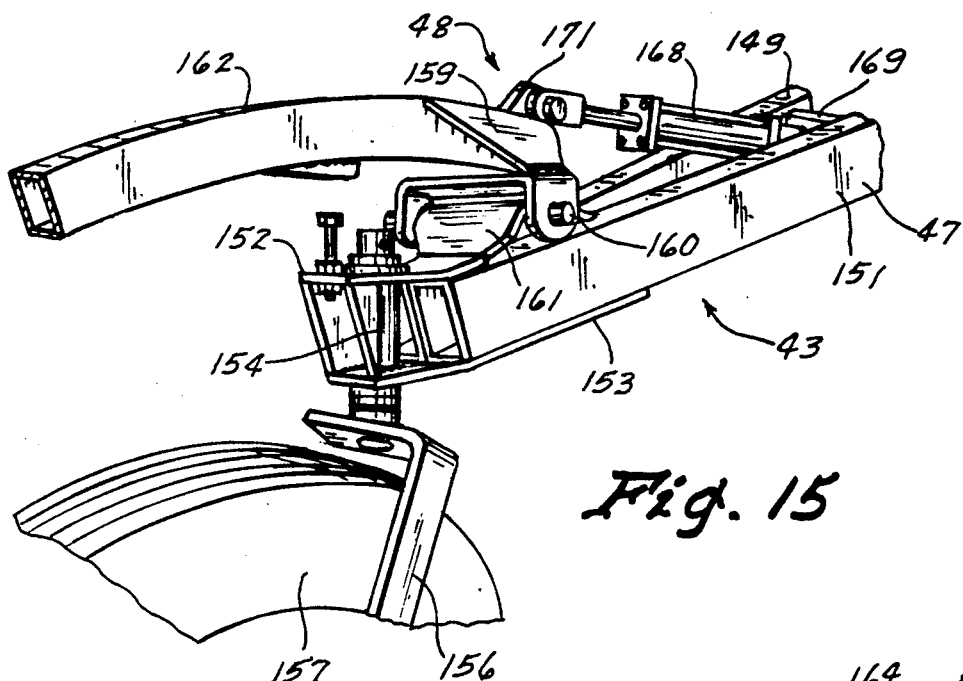
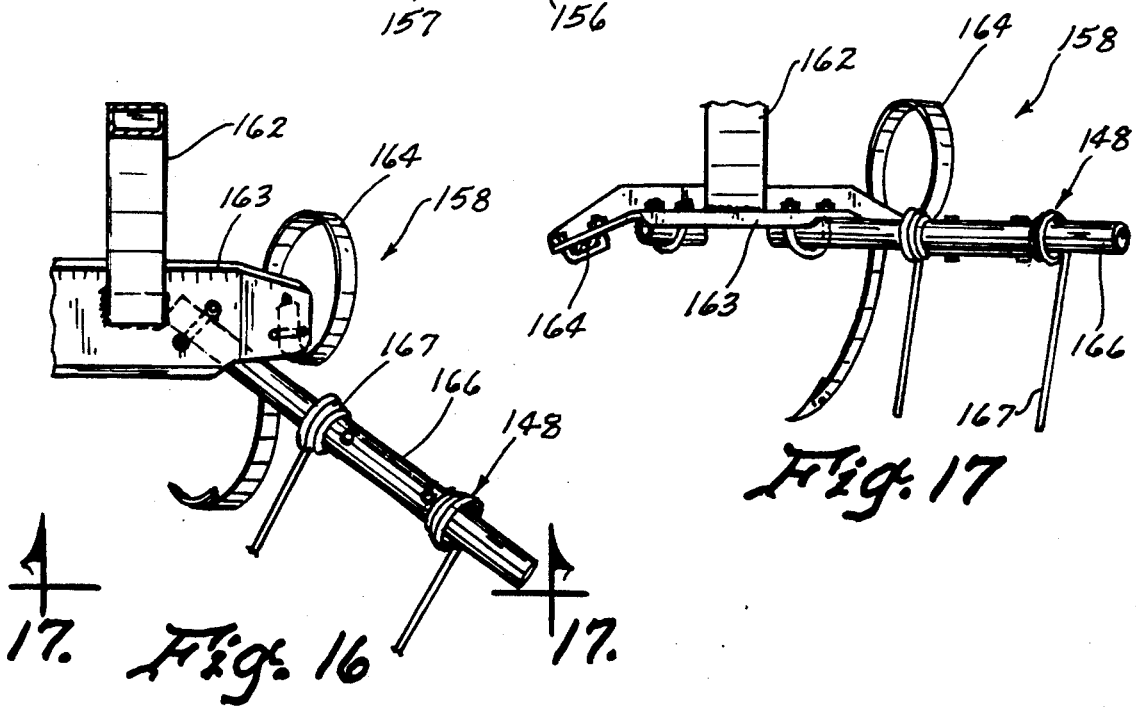

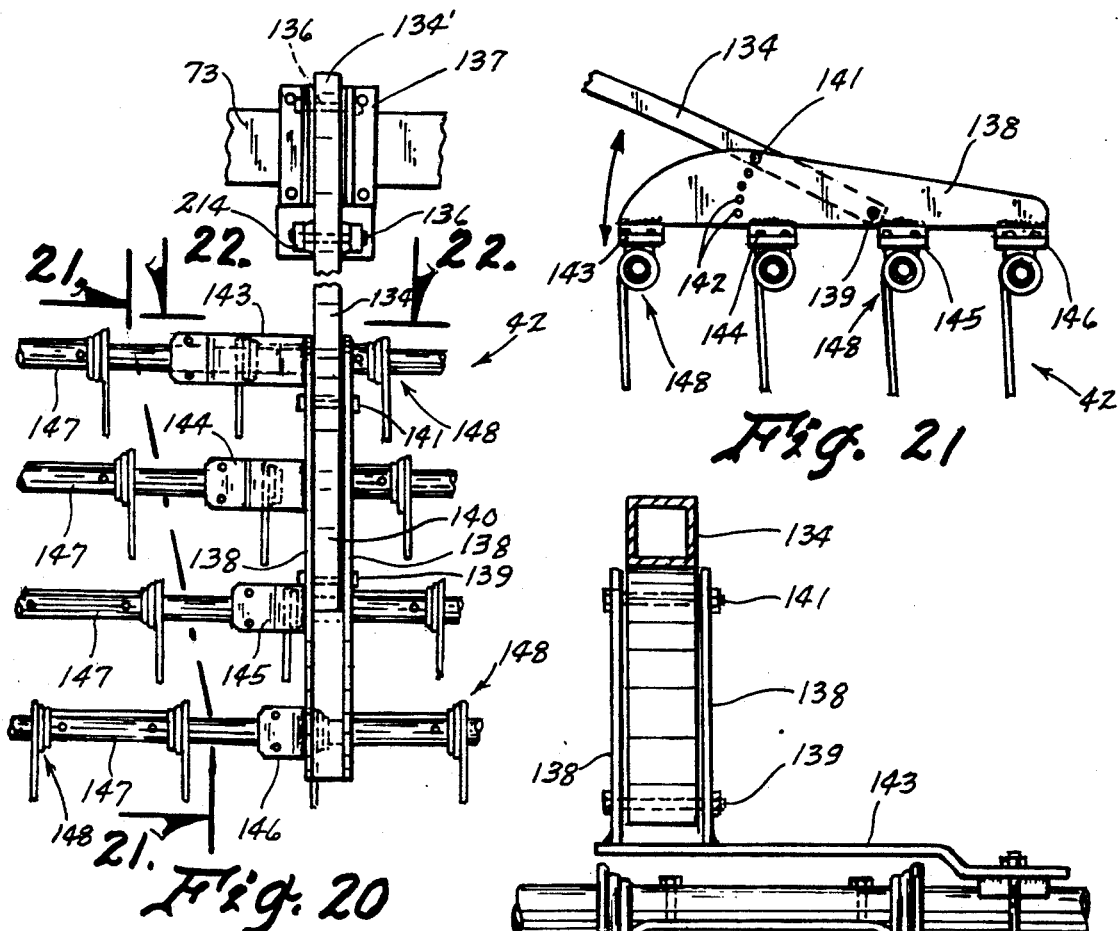
Fig. 20
Fig. 21
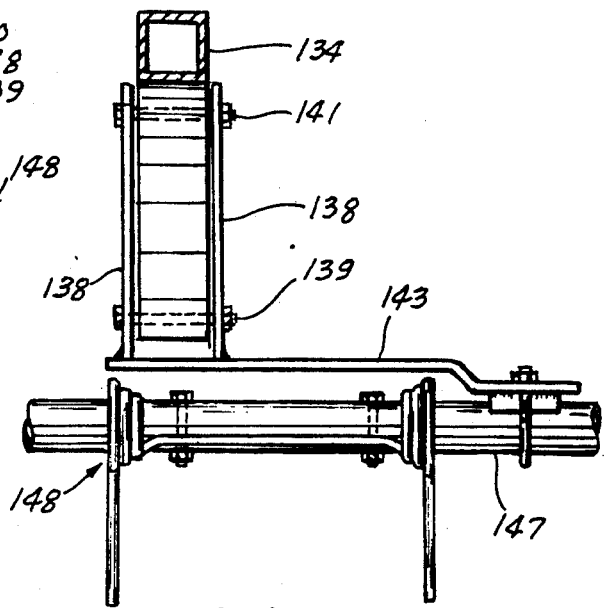
Fig. 22
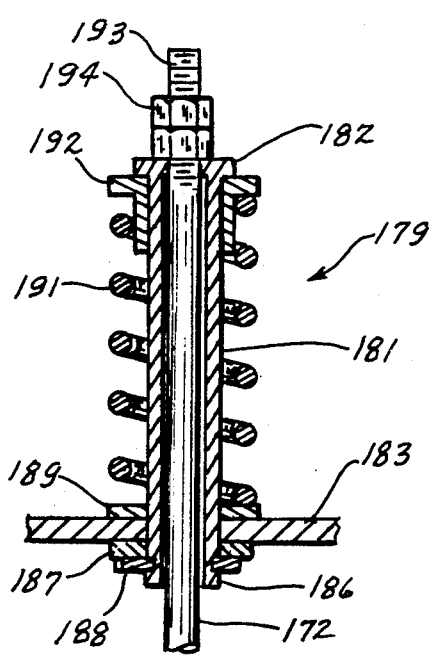
Fig. 23

FIELD CULTIVATOR LEVELING DEVICE

TECHNICAL FIELD

The present invention relates to agricultural tillage equipment; and more particularly to a tillage system which is capable of a complete working and cultivating of the ground in a single pass.

BACKGROUND ART

With the advent of "single pass" tillage, unsolvable and unacceptable problems have arisen. Conventional wisdom and tillage systems merely place two or more cultivating implements in tandem behind a prime mover without attention to the ultimate configuration of the implement in relation either to each other or to their respective down pressures during tillage operations.

For example, a conventional harrow's weight is carried out over the back of the implement and requires an adjustment on the disc or field cultivator to provide proper ground clearance when lifted. This lifting adjustment combined with the lifting of the rear of the disc or field cultivator that occurs when down pressure is applied to the harrow by downward movement of the disc or field cultivator creates such problems. No known equipment of a contemporary nature is available to provide a leveling of both the disc or field cultivator and the trailing spring tooth harrow, both connected in tandem and with separate frames, for example, such that both implements run and till flat.

Other problems occur in such equipment wherein attachment and detachment of the trailing implement to the lead implement is extremely difficult and time consuming; control of the raising and lowering of the implement's cultivating tools, and pivoting wing extensions if available, is not always of a unified nature; maneuverability of the entire system as an integral unit is rarely obtainable with at least two implements connected in tandem; and complicated structures are required for adjusting and controlling the carrying height of and the down pressure on the second, trailing cultivating elements.

To the solution of these problems, this invention is directed.

DISCLOSURE OF THE INVENTION

The present invention is directed to a tillage system which is designed to completely till the soil in a single pass.

This invention overcomes the problems noted above by the provision of a trailing cultivator having a frame mounted on the frame of the leading cultivator, which trailing cultivator frame carries the cultivating elements, and with a drawbar unit pivotally connected at its front end to the trailing cultivator frame and ground supported at its rear end by a caster unit, such that the weight of the trailing implement is transferred forward to the connection of the trailing implement frame connection with the frame of the leading implement, whereby the weight at the rear of the frame of the leading cultivator is now positive rather than negative.

This leveling arrangement is enhanced by a hydraulically operated mechanism mounted between the frame and the drawbar unit of the trailing cultivator implement capable of adjustably increasing the downward pressure of the frame carrying the cultivating elements while simultaneously decreasing the downward pressure of the trailing implement upon the lead implement, whereby both tandem-connected implements tend to run flat with maximum efficiency of soil cultivation.

Other solutions occur due to the trailing implement's connections with the lead implement comprising merely a pair of pins, readily removed and replaced, with the trailing implement having parking stands for ease of positioning during connection to and from the lead implement. The pins are inserted through mounting arms movably connected by brackets to the trailing implement frame for adaptability of mounting.

A hydraulic system is provided wherein both the lead and trailing implement cultivating elements may be raised and lowered simultaneously, where if wing units are provided for both implements, they also are raised and lowered simultaneously, and further, with the provision of quick couplers for making hydraulic connection to the lead implement quick and easy.

The carrying height of the trailing implement cultivating element is accomplished by a single component adjustment, as is the down pressure adjustment, with both components manually adjusted with ease and readily accessible. The stress and abuse that the trailing implement and its caster wheel assembly would normally be subjected to when crossing uneven terrain is virtually eliminated and a floating, smooth ride is provided by a coil spring shock-absorber assembly as part of the hydraulically operated mechanism referred to hereinbefore.

A second cultivator may be mounted on the frame of the trailing implement having sturdy, angled teeth for breaking up large clods and corn stumps without plugging or bunching; and a third cultivator may also be mounted on the trailing implement frame and having adjustably spaced harrow bars with swing mounted teeth, the bars equipped with springs in both directions to provide down pressure and also cushion the unit when carrying and transporting. Novel mountings for the harrow bars provide a twisting capability of the bars during cultivating, providing for flexibility of the harrow operation.

The rear caster wheel unit provides for maneuvering the entire unit, the lead and trailing implement, as an integrated tillage system under all circumstances; and further includes a fourth cultivator vertically movable by a hydraulic unit, and which fourth cultivator completes the cultivation, including digging up the soil leveled by the caster wheel.

BRIEF DESCRIPTION OF THE DRAWINGS

FIG. 4 is a plan view of the field cultivator leveling device of FIG. 1, with all wing extensions of the lead and the trailing cultivator implements in raised positions;

FIG. 5 is an enlarged, fragmentary view of a portion of FIG. 1;

FIG. 6 is an enlarged view of the pivoting structure for one wing of the trailing implement;

FIG. 7 is a view taken along the line 7—7 in FIG. 6;

FIG. 8 is a side elevational view taken along the line 8—8 in FIG. 5;

FIG. 9 is a rear elevational view taken along the line 9—9 in FIG. 8;

FIG. 10 is a side elevational view taken along the line 10—10 in FIG. 5;

FIG. 11 is a rear elevational view taken along the line 11—11 in FIG. 10;

FIG. 12 is an enlarged, sectional elevational view taken along the line 12—12 in FIG. 5;

FIG. 13 is a front elevational view taken along the line 13—13 in FIG. 12;

FIG. 14 is a fragmentary, side elevational view taken along the line 14—14 in FIG. 1;

FIG. 15 is a perspective view taken along the line 15—15 in FIG. 14;

FIG. 16 is a plan view taken along the line 16—16 in FIG. 2;

FIG. 17 is an elevational view taken along the line 17—17 in FIG. 16;

FIG. 20 is an enlarged, fragmentary view of a section of the field cultivating implement as shown in FIG. 1;

FIG. 21 is a sectional, side elevational view taken along the line 21—21 in FIG. 20;

FIG. 22 is a front elevational view taken along the line 22—22 in FIG. 20; and

FIG. 23 is an enlarged sectional view as taken along the line 23—23 in FIG. 12.

BEST MODE FOR CARRYING OUT THE INVENTION

Figure 1:
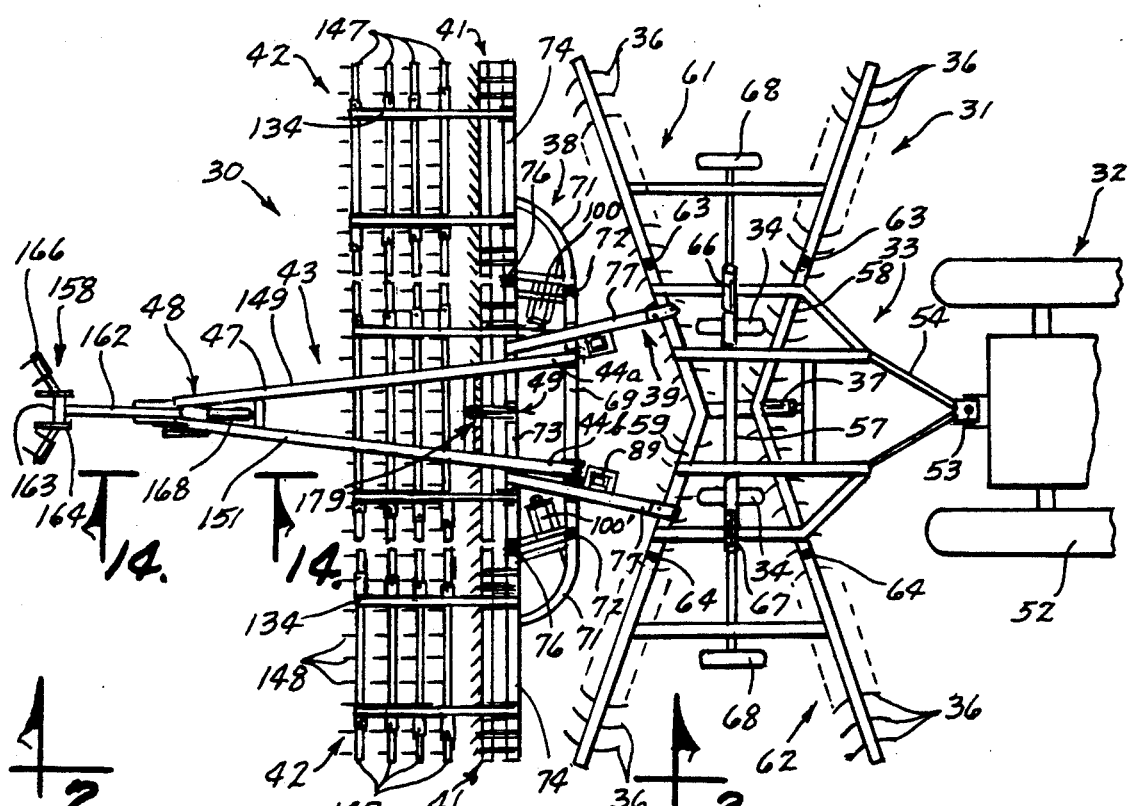
FIG. 1 is a plan view of the field cultivator leveling device of the present invention shown in position behind a prime mover, the latter being shown in fragmented form.

Referring now to the drawings, the agricultural implement of this invention is indicated generally at (30) in FIG. 1, and works in conjunction with a conventional disc cultivator (31), for example, pulled by a prime mover (32), the disc cultivator (31) having a frame (33) in general transported by ground engageable wheels (34) and to which ground engageable disc blades (36) are mounted, the disc blades (36) raised and lowered by a hydraulic unit (37) mounted on the frame (33).

Figure 2:
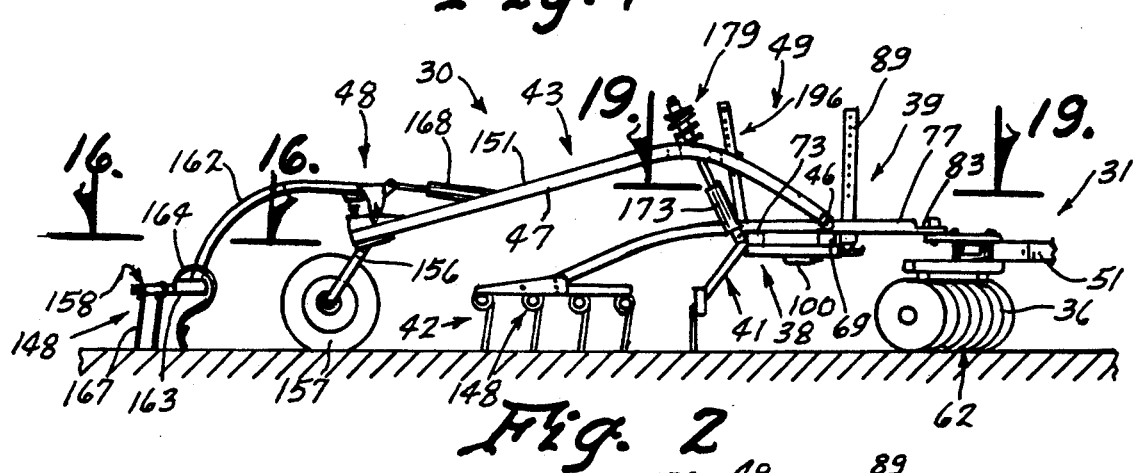
FIG. 2 is a view taken along the line 2—2 in FIG. 1, showing first, second, third and fourth cultivating components on a ground level.
Figure 3:
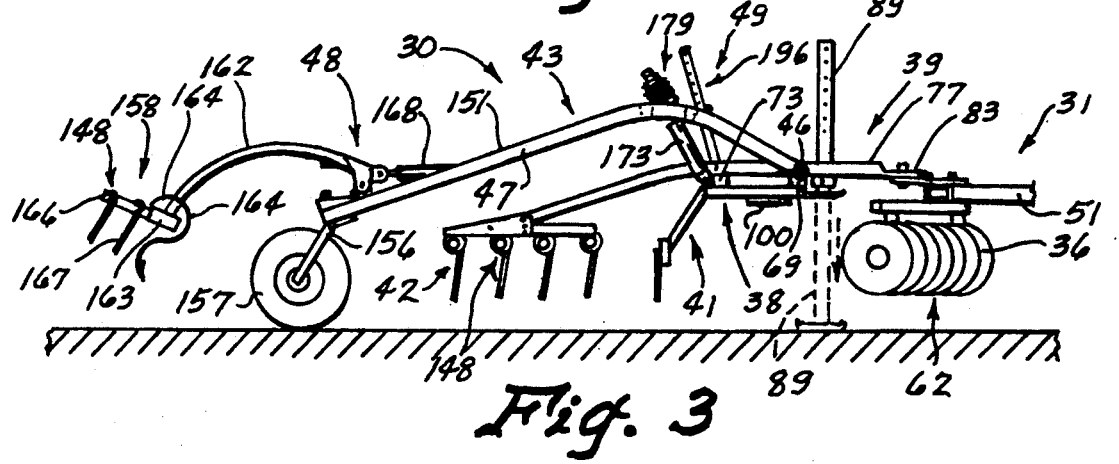
FIG. 3 is a view similar to the side elevational view of FIG. 2, with the various cultivating components being shown in a raised, transport position.

The implement (30) comprises generally its own frame unit (38); a mounting unit (39) for attaching the frame unit (38) to the disc cultivator (31); a second cultivator (41) attached to the frame unit (38); a third cultivator (42) attached to the frame unit (38) and disposed rearwardly of the second cultivator (41) as best shown in FIG. 2; a draw bar unit (43) (FIGS. 1 and 2) having front ends (44a) and (44b) pivotally connected at (46) each to the frame unit (38), and having further a rear end (47) to which a caster wheel unit (48) is mounted; and a lift assembly (49) (FIGS. 1 and 2) interconnected to and disposed between the frame unit (38) and the drawbar unit (43) for adjustably moving the frame unit (38) vertically relative to the drawbar unit (43) between a first ground engaging position of the second and third cultivators (41), (42) respectively, as best shown in FIG. 2, and a second position with the second and third cultivators (41), (42) raised above the ground for transport and/or turning purposes, as best shown in FIG. 3.

By this arrangement, and with the rear end (47) of the drawbar (43) portion of the implement (30) mounted on the caster wheel unit (48), the weight of the implement (30) is transferred forward to the connections by the mounting unit (39) to the lead implement (31), and as downward pressure of the second and third cultivators (41), (42) is applied to the frame unit (38), upward or a positive pressure is applied to the rear end (51) (FIG. 2) of the lead disc cultivator (31) to provide for a level tillage action of all the cultivating equipment. It will be understood, as stated hereinbefore, that under ordinary circumstances, a conventional harrow's weight is carried on the rear of the disc frame (33). But by the provision of the lift assembly (49) as detailed hereinafter, a downward pressure on the cultivators (41), (42) is transmitted through the framework (38), (39) to the rear of the disc frame (33), thus relieving the negative pressure of the implement (30) thereon, such that the weight at the rear of the cultivator is positive.

More particularly, the prime mover (32) is a tractor having drive wheels (52) and a rear hitch (53) to which a connecting hitch (54) of the disc cultivator (31) is pivotally connected for movement about both vertical and horizontal axes. The disc cultivator (31) is comprised basically of a pair of inner wheels (34) (FIG. 1) normally spaced above the ground and mounted on transverse member (57) of the frame (33), a forward frame member (58), and a rearward frame member (59), and with the frame members (57), (58) supporting the disc blades (36). Of an optional nature, each side of the disc cultivator frame (33) is provided with disc-blade carrying wing units (61), (62) pivotally connected at (63), (64) to the frame members (58), (59) and movable vertically by respective hydraulic units (66), (67) (FIGS. 1 and 4). The wing units (61), (62) are provided with wheels (68) which raise and lower with the wing units.

Figure 19:
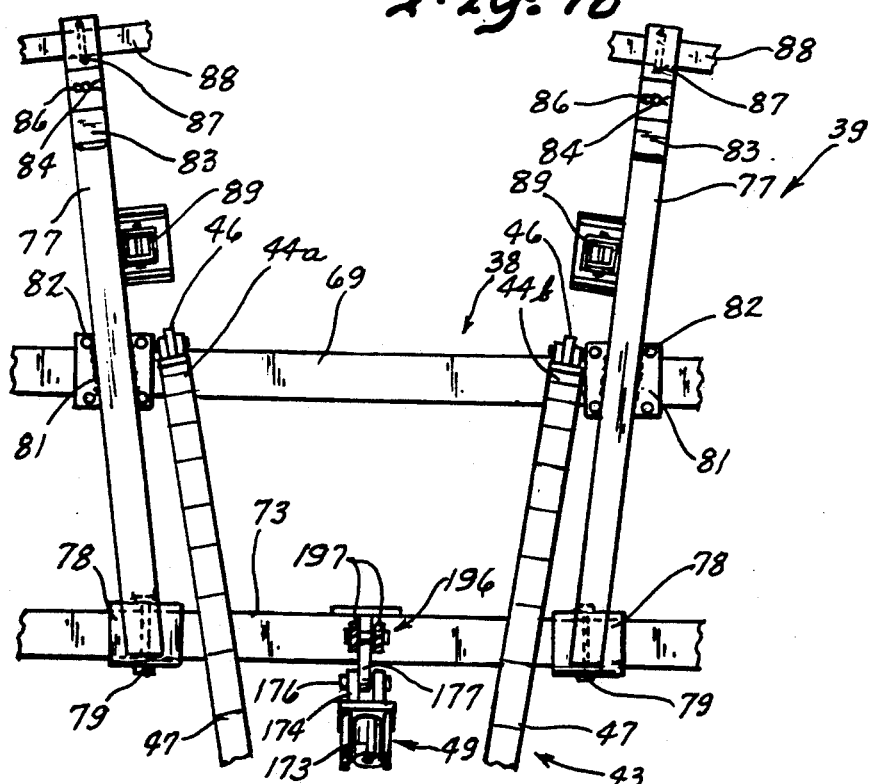
FIG. 19 is an enlarged, fragmentary plan view of a portion of the invention as shown in FIG. 1.

Referring to the drawings with particularity as to the trailing implement (30), the frame unit (38) comprises a forward element (69) with curved wings (71) pivotally connected at (72) to the element (69), and a straight rearward transverse element (73) behind the forward element (69), with straight wing ends (74) pivotally connected at (76) to the transverse element (73). The frame unit (38) includes further a pair of mounting members (77) each having a U-shaped bracket (78) (FIG. 19) and a flat bracket plate (81) welded thereto as illustrated. The members (77) are transversely, adjustably attached to the forward and rearward elements (69) and (73) as by fasteners (79) and U-bolts (82) secured, respectively, to the brackets (78), (81). The forward ends (83) of the mounting members (77) are secured by tapered pins (84) and cotter keys (86) to straps (87) adjustably placed laterally as desired on transversely spaced portions (88) of the disc cultivator rear frame member (59) (FIG. 19). This mounting arrangement makes the implement adaptable to most disc-type cultivators (31). Elongated parking stands (89) (FIG. 12) are vertically adjustably mounted, as by fastener pins (91), within sleeves (92) to the mounting members (77).

Referring to FIGS. 6 and 7, hydraulic unit (100) for the left wing section (71), (74) is depicted, and as it is identical to the other hydraulic unit (100') (FIG. 1), will be described, as for raising and lowering the wing section. The forward pivotal connection (72) is comprised of a pair of reversely nested U-shaped elements (93) pivotally connected by a fastener pin (94), and the rear pivotal connection (76) is comprised of a pair of reversely connected L-shaped elements (96) pivotally connected by a fastener pin (97), the pivot connections (72), (76) strengthened by a pair of transversely spaced braces (98), (99) mounted in parallel relationship, respectively, between the stationary frame elements (69), (73), and the movable wing ends (71), (74).

The hydraulic cylinder (100) is mounted between a pair of elongated bars (101) secured as by welding beneath the braces (98), (99) and the forward frame element in parallel relationship, with a U-shaped cap (102) welded to the braces inner ends and embracing the cylinder ends (103) with spacers (104), through which a fastener (106) is pivotally held.

A shock absorbing head (107) is also held pivotally between the ends (103), and with its shaft (108) extended outwardly through an opening (not shown) in the cap (102) having an outer washer (109), a spring (111) held between the cap (102) and the washer (109), the latter positioned as by nuts (112) secured to the shaft outer end (113). A slot (114) (FIG. 7) is formed in each side (116) of the cap (102) to receive the fastener (106) ends in a longitudinally slidable manner as indicted by the arrows in FIG. 7.

At the other end of the cylinder (100), its piston (117) is pivotally connected to the inner end (118) of a bracket (119) secured to the underside of the wing end (71). Upon extension of the piston (117), the wing section (71), (74) is pivotally lifted by rotating about the pivotal connections (72), (76), the rotation being limited by a square tubular member (121) (FIGS. 6 and 7) secured between the elongated bars (101), the inner end (118) striking the member (121) and preventing further extension of the cylinder piston (117). Retraction of the piston (117) rotates the wing section (71), (74) back to its normal horizontal position. In that position of the hydraulic piston (117), flexibility of the wing section (71), (74) during tillage is provided by the combined pivotal mounting of the cylinder (100) and its capability of slight longitudinal movement with the cap slots (114).

The second cultivator (41) is shown in detail in FIGS. 8 and 9 and comprises a plurality of brackets (122) fastened to the frame transverse element (73), and to the wing ends (74) if used, as by U-bolts (123), and to which is pivotally connected at (126) a plurality of channel shaped arms (124) for supporting an elongated transversely extended member (127) to which are mounted a plurality of ground engaging rods (128) as illustrated. The arms (124) are each spring supported on the front and the rear by springs (129), (131) each connected between either the front (132) or the rear (133) of the bracket (122) and the lower portions of the arm (124).

The third cultivator (42) is best shown in FIGS. 5, 20-22, and comprises a plurality of transversely spaced, rearwardly extended arms (134) which are mounted by pivot elements (136) (FIG. 10) to brackets (137) laterally adjustably mounted on the frame transverse element (73), and to the wing ends (74) if used. Each arm (134) has an outer end nested within an upwardly disposed channel element (138), and secured by a pin (139) at the rear (140), and by another pin (141) adjustably inserted in one of a series of holes (142) formed in the sides of the channel element (138). A plurality of relatively flat, flexible plates (143), (144), (145) and (146) are secured in longitudinally spaced relation on the underside of the channel element (138) (FIGS. 21, 22), with the plates (143-146) being progressively shorter from front-to-rear as to arm (134') (FIG. 5), from rear-to-front as to arm (134"), and front-to-rear as to arm (134'''); with the reverse arrangement on the right side of the implement (30) as viewed in FIG. 1. To each plate (143-146), an elongated tubular member (147) is secured (FIG. 22) and with a plurality of spring steel teeth units (148) mounted on the members (147) in transversely spaced relation. Shock absorption is provided for each arm (134) by a pair of oppositely acting springs (209), (211) (FIGS. 10, 11) mounted on either side of a plate (212) secured to the transverse frame element (73), and embracing a rod (213) secured to a bracket (214) in turn connected to the arm (134).

The drawbar unit (43) is comprised of a pair of elongated bars (149), (151) each of an identical, arched shape from the front ends (44a) and (44b) to their joined rear ends at (47), the arch being sufficient to extend up and over the frame unit (38), mounting unit (39), and the second and third cultivator (41), (42) mounted onto the frame unit (38), all as best shown in FIGS. 1 and 2.

Referring to FIGS. 14-17, the caster wheel unit (48) is depicted as comprising a pair of upper and lower plates (152), (153) respectively, secured to the joined rear ends of drawbar unit (43) of the drawbars (149), (151), for supporting a caster device (154). At the lower end of the caster (154), a mounting arm (156) is rotatably connected and to which is mounted a rear wheel (157). A rear cultivator (158) may be mounted on the rear end of drawbar unit (43) by means of a U-shaped bracket (159) being pivotally connected at (160) to the rear end (161) of the upper plate (152), and secured as by welding to an elongated, curved bar (162) extended rearwardly over the wheel (157). At the rear, lower end of the bar (162), a bracket (163) is mounted for supporting a pair of Danish teeth (164), each on one side, and a pair of laterally and downwardly extended bars (166) each with a spring tooth unit (167) secured thereto. A hydraulic piston and cylinder unit (168) (FIG. 15) is pivotally connected between a bracket (169) secured between the drawbars (149), (151) and a pair of ears (171) mounted on the bracket (159) for raising and lowering the rear cultivator bar (162). By this arrangement, any ridge left by the forward cultivators, including any caster wheel track is torn up by the teeth and teeth units (164), (167).

As best shown in FIGS. 12, 13 and 23, the lift assembly (49) is comprised first of a piston (172) and cylinder (173) unit secured at its lower end (174) to a bracket (177) mounted on the transverse frame element (73) at its center (FIG. 5), as by fasteners (178). The piston (172) extends completely through a shock absorber device (179) (FIG. 23) comprising an elongated tube (181) with a cap (182) at the upper end, and the lower end of which extends through a plate (183) secured to and extended between a pair of brackets (184) mounted in parallel relationship between the drawbars (149), (151), to dampen relative movement between the drawbar unit (43) and the implement frame unit (38), to eliminate stresses thereon when traveling over rough terrain.

The lower end of the tube (181) is connected to the plate (183) by a washer (187) and snap ring (188), and with a washer (189) above the plate (183) for seating a strong coil spring (191) between the washer (189) and a collar (192) seated against the cap (182), with the device (179) held at the top of the piston upper end (193) by a pair of nuts (194).

The lift assembly (49) is comprised further of a device (196) for controlling the down pressure on the cultivators (41), (42) having a pair of flat, elongated bars (197) arranged in a spaced, parallel, side-by-side manner, with their lower ends (198) pivoted (199) to the bracket (177). A series of vertically spaced holes (201) is formed in the upper ends of the bars (197) for receiving a pin device (202) in any transversely aligned pair, and a nut device (203) connects the bars (197) at a lower location. The nut device (203) will limit the carrying height of the second and third cultivators (41), (42) when operation of the lift assembly (49) raises the frame unit (38) toward the drawbars (149), (151), due to the nut device (203) moving toward, and engaging a limit bracket (204) welded to an adjacent cross bracket (184) and inserted between the bars (197). The bars (197) are prevented from moving away from the limit bracket (204) by the cross bracket (184) and bolt (206) secured to the outer end of the limit bracket (204).

Additionally, the down pressure of the second and third cultivators (41), (42) as mounted on the frame unit (38) is easily and quickly adjustable by merely repositioning the location of the pin device (202) within the holes (201), the down pressure being limited by the pin device (202) engaging the upper surface of the limit bracket (204).

Figure 18:
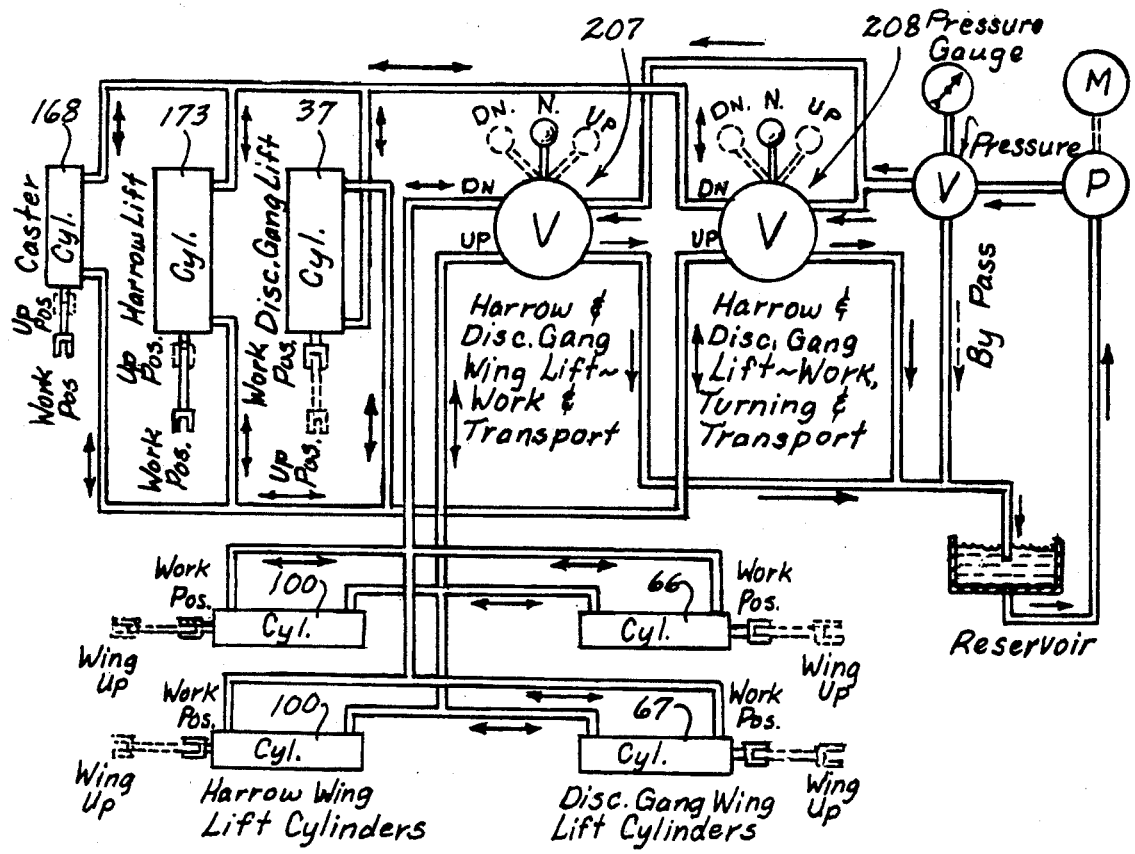
FIG. 18 is a diagram of the hydraulic circuit for the invention.

The hydraulic system for the combined implement (30) and disc cultivator (31) is shown in FIG. 18 and is self explanatory by the standard symbols. It will be seen that a single control (207) is provided for simultaneous operation of all wing cylinders (66), (67) and (100); and a single control (208) is provided for simultaneous operation of all cultivator cylinders (37) and (173), including a simultaneous raising and lowering of the caster rear cultivator (158) cylinder (168).

Thus, when used in conjunction with the disc cultivator (31) which tills the soil, cuts and buries some of the trash, the implement (30) can be easily attached thereto without creating an imbalance on the cultivator (31), and whereby the improved implement frame unit (38), mounting unit (39) and drawbar unit (43) can carry either a second cultivator (41) having ground engaging rods (128) for breaking up large clods and the like, and/or a third cultivator (42) with ground engaging spring steel teeth units (148) for trash clearing, and/or a rear cultivator (158) for eliminating a ridge which may be left by action of the front discs (36). Although the present hydraulic structure raises and lowers the cultivator units (41), (42) and (158) simultaneously with the cultivator (31) for turning and transport purposes, and for a single pass cultivation purpose; it can be readily seen that individual hydraulic control of the various cultivator units can be provided, whereby either the second and third cultivators (41), (42), respectively, can be operated separately from the rear cultivator (158), and of course vice versa.

I claim:

1. An improved agricultural implement for working in conjunction with a first cultivator pulled by a prime mover, the first cultivator having a frame to which ground engaging members are attached, and having further ground engageable wheels, with the members movable vertically by a hydraulic unit to a transport position, the implement comprising:
   a second frame;
   a mounting unit for attaching said second frame to the first cultivator frame;
   at least one second cultivator mounted on said second frame;
   draw bar means having a front end and a rear end, said front end pivotally mounted on said second frame;
   a ground engaging caster unit supporting said rear end; and
   means interconnected to and disposed between said second frame and said draw bar means, said interconnected means connected to said draw bar means intermediate said front end and said rear end for adjustably moving said second frame vertically relative to said draw bar means between a first ground engaging position with said at least one second cultivator engaging the ground and a second position with said at least one second cultivator raised above the ground for transport;
   and with said drawbar means having a pair of elongated bars forming a V-shape in plan, with the apex at said rear end, and each said bar having a portion intermediate said front and rear ends which is spaced above said second frame.

2. The invention of claim 1, and further with said mounting unit including a pair of elongated members each mounted on said frame and extending forwardly therefrom for attachment to the first cultivator.

3. The invention of claim 1, and with said caster unit including a ground engaging wheel, and implement means trailing said wheel for cultivating the soil behind and to either side of said wheel.

4. The invention of claim 1, and with said interconnected means including a hydraulic unit for raising and lowering said second frame relative to said drawbar means including further means for adjusting the downward pressure of said second frame toward the ground.

5. The invention of claim 4, and with said interconnected means including also means for adjusting the carrying height of said second frame above the ground.

6. The invention of claim 4, and with said interconnected means including further means for absorbing the shock against said second frame and said drawbar means due to movement of said implement over uneven terrain.

7. The invention of claim 3, and with first hydraulic means operable for simultaneously raising the first cultivator, the at least one second cultivator, and said implement means from ground engaging positions to raised transport positions.

8. An improved agricultural implement for working in conjunction with a first cultivator pulled by a prime mover, the first cultivator having a frame to which ground engaging members are attached, and having further ground engageable wheels, with the members movable vertically by a hydraulic unit to a transport position, the implement comprising:
   a second frame;
   a mounting unit for attaching said second frame to the first cultivator frame;
   at least one second cultivator mounted on said second frame;
   draw bar means having a front end and a rear end, said front end pivotally mounted on said second frame;
   a ground engaging caster unit supporting said rear end; and
   means interconnected to and disposed between said second frame and said draw bar means, said interconnected means connected to said draw bar means intermediate said front end and said rear end for adjustably moving said second frame vertically relative to said draw bar means between a first ground engaging position with said at least one second cultivator engaging the ground and a second position with said at least one second cultivator raised above the ground for transport;

and with said second frame having a forward element and a rearward element, said elements generally parallel and disposed substantially normal to the general direction of travel of the first cultivator;

and with said mounting unit including a pair of elongated members each mounted on said second frame and extended forwardly therefrom for attachment to the first cultivator, and further with a third cultivator implement mounted on said frame in a position trailing said second cultivator, both said second and third cultivators movable with said frame between a first ground engaging position and a second, raised transport position;

and with said interconnected means including a hydraulic unit for raising and lowering said second frame relative to said drawbar means including further means for adjusting the downward pressure of said second frame toward the ground.

9. The invention of claim 8, and with said second frame having wing units pivotally connected to said elements and including hydraulic units operable to raise and lower said wing units.

10. The invention of claim 8, and with said second and third cultivators having wing assemblies mounted on said second frame wing units and movable therewith between ground engaging positions and transport positions.

11. The invention of claim 8, and with said elongated bars having front ends pivotally connected to second frame rearward element, equidistantly from and on opposite sides of the longitudinal centerline of the implement.

12. The invention of claim 8, and with said interconnected means including also means for adjusting the carrying height of said second frame above the ground.

13. The invention of claim 9, and with the first cultivator having wing units liftable to a transport position, second hydraulic means operable for simultaneously moving said first cultivator and said second frame wing units from ground engaging positions to raised transport positions.

14. A cultivating implement adapted for attachment in tandem to a wheeled implement comprising:
a frame;
a mounting unit for attaching said frame to the wheeled implement;
at least one cultivator mounted on said frame;
draw bar means having a front end, a rear end, and a portion intermediate said front and rear ends extending over said frame, said front end pivotally mounted on said frame;
a ground engaging caster unit supporting said rear end; and
hydraulic means interconnected to and disposed between said frame and said draw bar means, said hydraulic means connected to said draw bar means intermediate said front end and said rear end for adjustably moving said frame vertically relative to said draw bar means.

* * * * *